(No Model.)

J. M. BROOKS.
SEED PLANTER.

No. 248,699. Patented Oct. 25, 1881.

WITNESSES:
Donn Twitchell.
C. Sedgwick.

INVENTOR:
J. M. Brooks
BY Munn & Co.
ATTORNEYS.

N. PETERS, Photo-Lithographer, Washington, D. C.

UNITED STATES PATENT OFFICE.

JAMES M. BROOKS, OF COLUMBUS, TEXAS.

SEED-PLANTER.

SPECIFICATION forming part of Letters Patent No. 248,699, dated October 25, 1881.

Application filed May 10, 1881. (No model.)

*To all whom it may concern:*

Be it known that I, JAMES MADISON BROOKS, of Columbus, in the county of Colorado and State of Texas, have invented a new Improvement in Seed-Planters, of which the following is a full, clear, and exact description.

Figure 1:
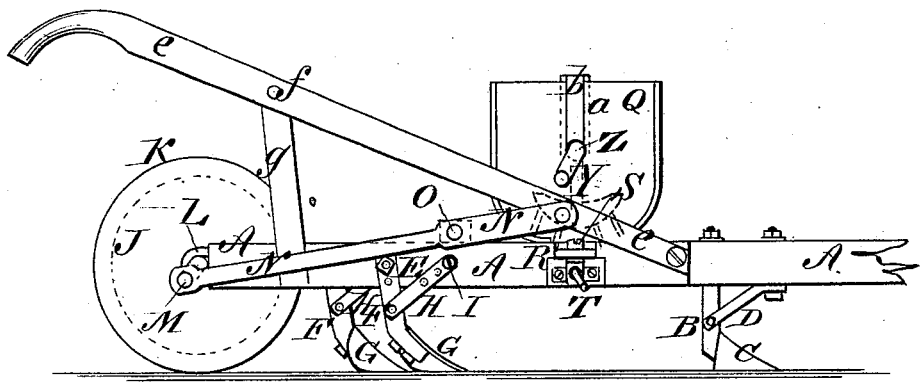
Figure 2:
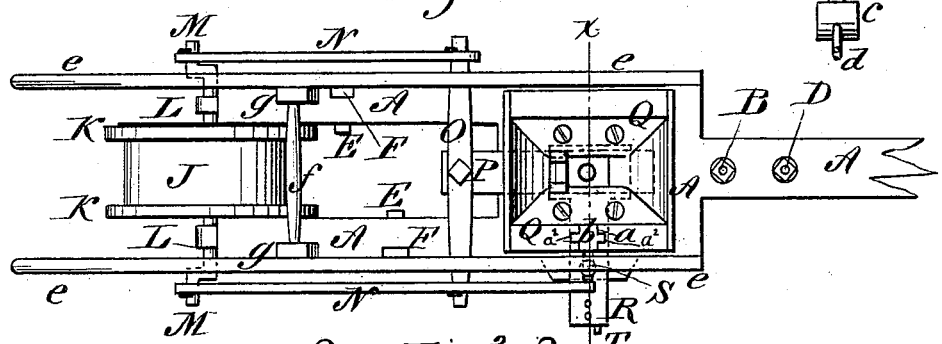
Figure 5:
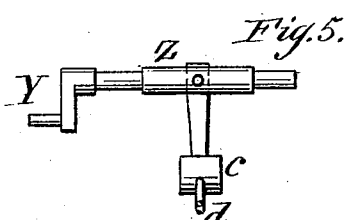
Figures 3, 6:
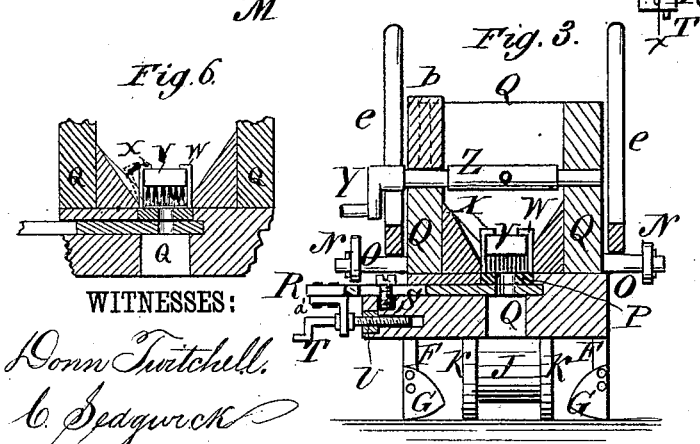
Figure 4:

Figure 1 is a side elevation of my improvement. Fig. 2 is a plan view of the same. Fig. 3 is a sectional front elevation of the same, taken through the line x x, Fig. 2. Fig. 4 is a side elevation of the stirrer. Fig. 5 represents the stirrer detached. Fig. 6 is a detail view of the brush and its catches.

My invention relates to improvements in seed-planters; and it consists in the peculiar arrangement and construction of the parts, as hereinafter more fully set forth, and pointed out in the claim.

A represents the frame of the planter, to the forward part of which is attached the upper end of the standard B. The standard B passes up through a hole in the frame A, and has a nut screwed upon its upper end, or is secured in place by other suitable means.

To the lower end of the standard B is attached a plow, C, to open a furrow to receive seed.

The plow C may be of any suitable form, and the draft-strain upon it is sustained by the brace D, the lower end of which is secured to the said standard, and its upper end is secured to the frame A.

To the side bars of the frame A are secured, by bolts E, the standards F, to the lower ends of which are bolted half-shovel plows G, or other suitable plows. Several holes are formed in the standards F, to receive the fastening-bolts E, so that the covering-plows can be adjusted to work deeper or shallower in the ground, as may be desired. The standards F are placed the one in advance of the other, to prevent them from becoming clogged with trash, and the draft-strain upon them is sustained by the braces H, the rear ends of which are bolted to the said standards F, and the forward ends are bolted to the side bars of the frame A. Several holes are formed in the upper parts of the braces H, to receive the fastening-bolts I, so that the said braces can be adjusted as the adjustment of the standards F may require.

J is a roller of such a length as to fit between the rear ends of the side bars of the frame A, and which has ring-flanges K around its ends. The roller J levels and smooths the ridge formed by the covering-plows G; but the main weight of the said roller is borne by the flanges K, to prevent the soil from being packed too closely upon the seed. The roller J is mounted on the shaft L, the journals of which revolve in bearings attached to the rear ends of the side bars of the frame A.

Upon the ends of the shaft L are formed, or to them are attached, cranks M, to which are pivoted the rear ends of two connecting-rods, N. The forward parts of the connecting-rods N have holes formed in them to receive the ends of a cross-bar, O, which is secured in place by pins or other suitable means. The bar O slides upon the upper sides of the side bars of the frame A, and to its center is secured, by a screw, bolt, or other suitable means, the rear end of a slide, P, which works in a recess in the bottom of the seed-box Q, and has one or two holes formed in it to receive seed from the seed-box and drop it to the ground. When the slide P is made with one hole a hill will be dropped at each revolution of the roller J, and when the said slide P is made with two holes a hill will be dropped at each half-revolution of the said roller J. The hole or holes in the slide P are made of such a size as to hold the exact quantity of seed to be dropped at a time, and when less or more seed, or larger or smaller seed, is to be dropped, the slide P is taken out and replaced with another slide having larger or smaller seed-receiving-holes, as required. The slide P rests upon a plate, R, which is placed in a recess in the frame A, and has a hole formed through it, through which the seed from the slide P drops to the ground. The outer end of the slide R is slotted to receive a screw or bolt, S, by which the said slide is secured in place when adjusted.

To a lug, a', attached to the lower side of the outer end of the slide R, is swiveled a crank-screw, T, which passes through a nut, U, secured to the frame A, so that the said slide can be adjusted by turning the said crank-screw T. The seed-dropping slide P is kept from carrying out any more seed than enough to fill the seed-receiving holes by a brush, V, secured to the lower part of the seed-box Q by the catches W X. The catch W is stationary, but the catch X is elastic, so that it can be sprung back to allow the brush V to be put in and taken out. One of the connecting-rods N is extended forward, and has a hole in its forward end to receive the crank Y, formed upon the end of the stirrer-shaft Z, which passes through a slot, $a$, in the adjacent side of the seed-box Q, and its other end works in a hole in the farther side of the said seed-box Q, so that the stirrer can be readily detached when not required for use.

The sides of the slot $a$ in one side of the seed-box are provided with grooves, (see Fig. 2,) and the slot $a$ leads down from the upper edge of the side of the seed-box Q, and is closed by a block, $b$, provided with tenons $a^2$ on its sides, adapted to fit and slide in the grooves in the sides of the slot.

To the middle part of the shaft Z is attached a semicircular block, $c$, with its curved edge downward. To the curved edge of the block $c$ are attached fingers $d$, to push the cotton-seed down to the discharge-opening in the bottom of the seed-box Q. The crank Y is made so much longer than the crank M that the revolution of the roller J will only rock the stirrer Z $c$ $d$. $e$ are the handles, the forward ends of which are attached to the forward part of the frame A, or to the lower part of the seed-box Q. The rear parts of the handles $e$ are connected by a round, $f$, and are supported by uprights $g$, attached to them and to the round $f$, and the lower end of which are attached to the rear part of the frame A.

When the machine is to be used for planting corn, broom-corn, and other smooth seeds, the stirrer Z $c$ $d$ is removed, and other appliances are connected and operated in the manner hereinbefore described. When the machine is to be used for planting cotton, the seed-dropping slide P, the cross-bar O, the shorter connecting-bar N, and the cut-off brush V are removed, the stirrer Z $c$ $d$ is put in place, and the slide R is adjusted to serve as a gage for regulating the size of the discharge-opening in the bottom of the seed-box, according as the quantity of seed to be planted may require.

I am aware that seed-planters have heretofore been constructed in which a connecting-rod operated by the cranked axle of a running wheel was arranged to be interchangeably connected with the seed-dropping devices or the stirrer-shaft, and I therefore lay no claim to this, broadly.

Having thus described my invention, what I claim as new, and desire to secure by Letters Patent, is—

The combination, with the seed-hopper Q and seed-slide P, of the stationary catch W and elastic spring-catch X, both secured to the hopper and arranged to grasp the head of the brush, substantially as described.

JAMES MADISON BROOKS.

Witnesses:
GEO. W. BROOKS,
JOHN F. ROSE.